(12) United States Patent
Wei

(10) Patent No.: US 10,739,500 B2
(45) Date of Patent: Aug. 11, 2020

(54) SHADING COMPONENT AND LENS MODULE USING SAME

(71) Applicant: Chuandong Wei, Shenzhen (CN)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 221 days.

(21) Appl. No.: 15/677,073

(22) Filed: Aug. 15, 2017

(65) Prior Publication Data
US 2018/0299591 A1    Oct. 18, 2018

(30) Foreign Application Priority Data

Apr. 15, 2017   (CN) .................... 2017 2 0399014 U

(51) Int. Cl.
| | |
|---|---|
| *G02B 5/00* | (2006.01) |
| *G02B 7/02* | (2006.01) |
| *G02B 5/02* | (2006.01) |
| *G02B 27/00* | (2006.01) |
| *G02B 13/00* | (2006.01) |

(52) U.S. Cl.
CPC ............. *G02B 5/003* (2013.01); *G02B 5/021* (2013.01); *G02B 7/021* (2013.01); *G02B 7/026* (2013.01); *G02B 27/0018* (2013.01); *G02B 13/004* (2013.01)

(58) Field of Classification Search
CPC ................................. G02B 5/003; G02B 5/005
USPC .......................................... 359/601, 738–740
See application file for complete search history.

(56) References Cited

U.S. PATENT DOCUMENTS

| | | | |
|---|---|---|---|
| 9,016,876 B2* | 4/2015 | Lai ..................... | G02B 13/0035 359/601 |
| 2006/0061884 A1* | 3/2006 | Chuman ................ | G02B 7/021 359/811 |
| 2006/0139772 A1* | 6/2006 | Watanabe .............. | G02B 7/025 359/811 |
| 2011/0019291 A1* | 1/2011 | Hirabayashi ....... | G02B 27/0018 359/738 |
| 2011/0050978 A1* | 3/2011 | Yano ....................... | B32B 37/12 348/335 |
| 2013/0063822 A1* | 3/2013 | Lin ......................... | G02B 13/18 359/601 |
| 2018/0341048 A1* | 11/2018 | Chou .................... | G02B 7/021 |

* cited by examiner

*Primary Examiner* — Darryl J Collins
(74) *Attorney, Agent, or Firm* — IPro, PLLC; Na Xu

(57) ABSTRACT

A shading component includes a base including a top surface near an object side, a bottom surface near an image side, an inner ring surface and an outer ring surface connecting the top surface and bottom surface; and a shading piece assembled with the base. The inner ring surface is formed with a groove depressing towards the outer ring surface, and at least a part of the shading piece is received in the groove. The present disclosure further provides a lens module using the shading component mentioned above.

7 Claims, 1 Drawing Sheet

SHADING COMPONENT AND LENS MODULE USING SAME

FIELD OF THE PRESENT DISCLOSURE

The present disclosure relates to imaging technologies, especially to a shading component used in a lens module.

DESCRIPTION OF RELATED ART

A lens module includes a lens and a shading component, and the shading component covers an edge of the lens, in order to guarantee that the outside light can penetrate through a part of the lens near an optical axis.

In the relevant technology, a shading component is made of plastics, and the shading component includes a base and a shading piece, because the shading component made of plastics is integrated and molded by injection, the locations of both base and shading piece are fixed, and the flexibility of setting the shading component is worse during an imaging of the lens module.

Therefore it is necessary to provide an improved shading component and a lens module for overcoming the above-mentioned disadvantages.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Generally, many electronic equipment, including iPad, computer and cell phone etc., are provided with lens modules, which includes a lens barrel, a lens and a shading component set in the lens barrel. The shading component can absorb the stray light generated after the incident line enters into the lens, in order to improve the imaging quality of the camera.

Figure 1:
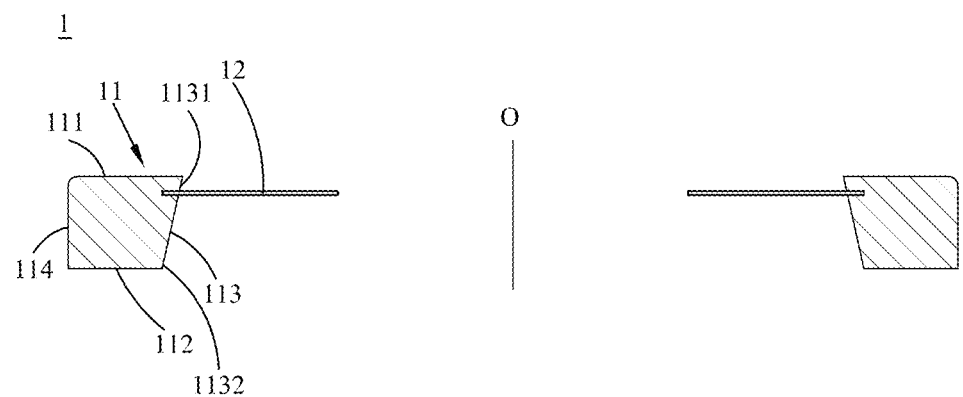
FIG. 1 is an illustrative cross-sectional view of a shading component in accordance with an exemplary embodiment of the present disclosure.

As shown in FIG. 1, a shading component 1 in accordance with an exemplary embodiment of the present disclosure includes a base 11 and a shading piece 12, in which, the shading piece 12 is embedded in the base 11. Both the base 11 and the shading piece 12 are hollow ring structures. Serving as a carrier of the shading piece 12, the base 11 can maintain the shading piece 12 in the presetting location in the lens barrel in a stable manner.

The base 11 includes a top surface 111 near an object side, a bottom surface 112 near an image side, an inner ring surface 113 and an outer ring surface 114 connecting the top surface 111 and the bottom surface 112, and the inner ring surface 113 is formed with a groove depressing towards the outer ring surface 114, and a part of the shading piece 12 is set in the groove. The inner ring surface 113 including a first end 1131 near the object side and a second end 1132 near the image side, the inner ring surface 113 extends from the first end 1131 to the second end 1132 away from an optical axis O.

According to above description, the shading component 1 is formed by embedding and installing the base 11 and the shading piece 12, which can make the relative locations of the shading piece 12 and the base 11 adjusted accordingly during embedding and installing, in order to accommodate the lens modules with different structures, and then increase the flexibility of the shading component 1.

In the present disclosure, the shading piece 12 is molded independently, e.g.: the shading piece 12 can be molded by mechanical processing, including stretching, extending and die-casting. The independently molded shading piece makes the shading piece 12 independent opposite to the base 11, and the location where the shading piece 12 is embedded and set in the base 11 depends on the demand of the lens module.

Further, preferably, the shading piece is made of metal, after using the scheme of metal shading piece, the shading piece 12 can be made by punching, in order to improve the processing technique of the shading piece 12 and reduce the rejection rate of the shading piece 12, on the other hand, comparing with the shading piece made of resin and polypropylene etc, the metal shading piece can be processed by extending, rolling and pressing, therefore, the thickness of the metal shading piece can be set relatively small.

Further, preferably, the metal shading piece includes the black shading layer, and the black shading layer is used for further absorbing the stray light and strengthening a role of extinction. According to one embodiment, the black shading layer can be set a surface by one side of the metal shading piece facing towards an object side. In some other embodiments, an outer surface of the metal shading piece can be set with black shading layer. Thus, various surfaces of the metal shading piece can absorb the stray light, and the extinction performance of the shading piece 12 can be further improved.

In two above embodiments, the black shading layer can be formed by coating black ink on the metal shading piece, or process the black oxidization treatment to the metal shading piece. The black oxidization treatment refers to oxidizing the surface of the metal shading piece into dense ferriferous oxide using an oxidant. On the one hand, this thin oxidant layer can protect the inside of the metal shading piece from being oxidized, on the other hand, the ferriferous oxide formed under low temperature (about 350° C.) is dark, therefore it is known as black treatment.

In the embodiment shown in FIG. 1, a base 11 can be set as a plastic, which can be processed and molded by injection, and this processing technique is simple, and the processing cost is lower.

In some embodiments, while a base 11 is processed and molded, a shading piece 12 can be embedded and set in an injection mould as an embedded piece, in order to combine both into an integrated structure. This processing technique is simple, and the processing cost is lower.

Preferably, the base 11 can be set as black shading base, e.g.: the base 11 is processed by black plastics, and the black shading base can absorb the stray light in the lens together with the shading piece 12, in order to further strengthen the extinction function of a shading component 1.

A second aspect of the present disclosure also provides a kind of lens module, and the lens module includes a shading component 1, a lens barrel 2 and at least two lenses 3. Both the shading component 1 and lens 3 are accommodated in an accommodation cavity of the lens barrel 2, and the shading component 1 is clamped and set between two adjacent lenses 3. In which, the shading component 1 is the shading component 1 in anyone of above embodiments.

Figure 2:
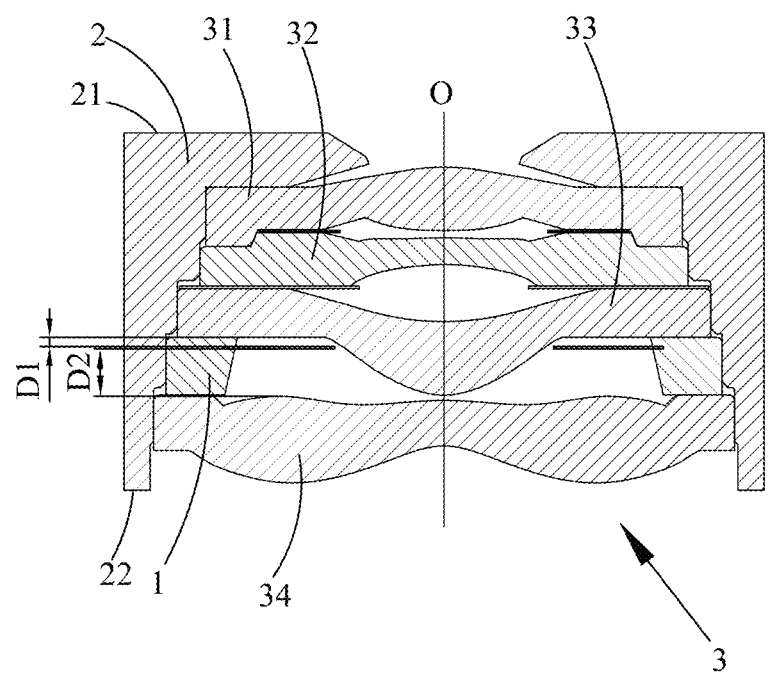
FIG. 2 is an illustrative cross-sectional view of a lens module using the shading component in FIG. 1.

Specifically speaking, as shown in FIG. 2, the shading component 1 and lens 3 are arranged in turn along the extending direction of an optical axis O, in which, there are many lenses 3, which are a first lens 31, a second lens 32, a third lens 33 and a fourth lens 34, and the shading component 1 is set between the third lens 33 and the fourth lens 34 that are adjacent. From FIG. 2, based on the definite structure of the third lens 33, setting the shading component 1 here can guarantee that there is a proper interval left between the third lens 33 and the fourth lens 34. The third lens 33 is set on the object side of the shading piece 12, the fourth lens 34 is set on the image side of the shading piece 12. A distance between the shading piece 12 and the third lens 33 is D1, and a distance between the shading piece 12 and the fourth lens 34 is D2, the distance D1 is less than the distance D2.

Further, a top surface 111 and a bottom surface 112 of a base 11 are leaned and connected to two adjacent lenses 3 respectively, i.e.: the base 11 is leaned and connected to a third lens 33 and a fourth lens 34, and this scheme can avoid setting additional shading components between the third lens 33 and the top surface 111 and between the fourth lens 34 and the bottom surface 112, which makes full use of the space in the lens barrel 2. Referring to FIG. 2, the shading piece 12 is spaced apart from both of the two adjacent lenses 33 and 34.

In addition, in the embodiment shown in FIG. 2, there is also a shading component set between a first lens 31 and a second lens 32 and between the second lens 32 and a third lens 33, however, in consideration of the space in the lens barrel 2 and the demand of the actual light path, a setup between the first lens 31 and the second lens 32 and the interval setup between the second lens 32 and the third lens 33, the definite structure of the shading component set here is different from the shading component 1, for example, as shown in FIG. 2, there is only one shading piece between the first lens 31 and the second lens 32, and between the second lens 32 and the third lens 33.

Notably, in some other embodiments, there can be more shading components 1 set, and various shading components 1 can be set between any two adjacent lenses 3 respectively.

Notably, in some other embodiments, the shading component 1 can be set between a first lens 31 and a second lens 32, or set between a second lens 32 and a third lens 33, and the present disclosure is not limited, and the amount of the lenses 3 is not limited.

In addition, on the one hand, a lens barrel 2 acts as a carrier for various lenses 3, on the other hand, it can also protect various lenses 3, for example, the lens barrel 2 has a first surface 21 and a second surface 22 distributed along an extending direction of an optical axis O, and various lenses 3 are all located in the space limited by the first surface 21 and the second surface 22.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module including:
   a lens barrel;
   at least two lenses accommodated and fixed in the lens barrel;
   a shading component located between two adjacent lenses among the at least two lenses;
   the shading component including a base, the base including a top surface near an object side, a bottom surface near an image side, an inner ring surface and an outer ring surface connecting the top surface and the bottom surface; the base is a black shading base; the inner ring surface including a first end near the object side and a second end near the image side, the inner ring surface extends from the first end to the second end away from an optical axis; a shading piece assembled with the base; the inner ring surface is formed with a groove depressing towards the outer ring surface, and at least a part of the shading piece is received in the groove;
   wherein the top surface and the bottom surface of the base are leaned and connected to the two adjacent lenses respectively; and the shading piece is spaced apart from both of the two adjacent lenses;
   the shading piece is molded independently with respect to the base; a distance between the shading piece and the adjacent lens near the object side is less than a distance between the shading piece and the adjacent lens near the image side.

2. The lens module as described in claim 1 including a first lens, a second lens, a third lens and a fourth lens arranged in turn from an object side to an image side along a direction of an optical axis, and the shading component is located between the third lens and the fourth lens.

3. The lens module as described in claim 1, wherein the base is made of plastic.

4. The lens module as described in claim 3, wherein both the base and the shading piece are integrated structures molded by injection.

5. The lens module as described in claim 1, wherein the shading piece is made of metal.

6. The lens module as described in claim 5, wherein an outer surface of the shading piece is provided with a black shading layer.

7. The lens module as described in claim 6, wherein the black shading layer is formed by black oxidization treatment.

* * * * *